United States Patent
Liu et al.

(10) Patent No.: US 10,980,052 B2
(45) Date of Patent: Apr. 13, 2021

(54) METHODS AND DEVICES FOR RESOURCE SCHEDULING

(71) Applicant: Beijing Xiaomi Mobile Software Co., Ltd., Beijing (CN)

(72) Inventors: Yang Liu, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/265,385

(22) Filed: Feb. 1, 2019

(65) Prior Publication Data

US 2019/0166616 A1 May 30, 2019

Related U.S. Application Data (63) Continuation of application No. PCT/CN2016/095055, filed on Aug. 12, 2016.

(51) Int. Cl.
*H04W 72/12* (2009.01)
*H04W 72/04* (2009.01)
(Continued)

(52) U.S. Cl.
CPC ....... *H04W 72/1289* (2013.01); *H04L 5/0007* (2013.01); *H04W 72/04* (2013.01);
(Continued)

(58) Field of Classification Search
CPC .. H04L 5/0007; H04W 72/04; H04W 72/044; H04W 72/0446; H04W 72/1289; H04W 76/27; H04W 88/08
See application file for complete search history.

(56) References Cited

U.S. PATENT DOCUMENTS

2016/0234857 A1 8/2016 Chen et al.
2017/0303302 A1* 10/2017 Bagheri ............ H04W 72/1257
(Continued)

FOREIGN PATENT DOCUMENTS

CN 101127806 A 2/2008
CN 101605024 A 12/2009
(Continued)

OTHER PUBLICATIONS

U.S. Appl. No. 62/321,657 (Bagheri et al.), filed 2016.*
(Continued)

*Primary Examiner* — Rina C Pancholi
(74) *Attorney, Agent, or Firm* — Finnegan, Henderson, Farabow, Garrett & Dunner, L.L.P.

(57) ABSTRACT

A resource scheduling method for use in a base station, includes: receiving semi-persistent scheduling (SPS) configuration information sent by a radio resource control (RRC) layer, the SPS configuration information including a period of SPS, the period of the SPS indicating a time interval between two adjacent scheduling subframes; determining a short transmission time interval (sTTI) resource activated in a target scheduling subframe according to the SPS configuration information and reference information; and providing an activation parameter to a physical layer according to the sTTI resource activated in the target scheduling subframe, such that the physical layer generates an activation notification containing the activation parameter for notifying a terminal of the sTTI resource activated in the target scheduling subframe.

22 Claims, 9 Drawing Sheets

(51) Int. Cl.
*H04W 76/27* (2018.01)
*H04L 5/00* (2006.01)
*H04W 88/08* (2009.01)

(52) U.S. Cl.
CPC ..... *H04W 72/044* (2013.01); *H04W 72/0446* (2013.01); *H04W 76/27* (2018.02); *H04W 88/08* (2013.01)

(56) References Cited

U.S. PATENT DOCUMENTS

| | | | |
|---|---|---|---|
| 2018/0070367 A1* | 3/2018 | Fujishiro | H04W 72/14 |
| 2018/0270853 A1* | 9/2018 | Hosseini | H04L 1/1819 |
| 2018/0270880 A1* | 9/2018 | Hosseini | H04L 5/0053 |
| 2018/0332605 A1* | 11/2018 | Pelletier | H04W 72/1289 |
| 2018/0375614 A1* | 12/2018 | Shimezawa | H04W 76/27 |
| 2019/0007176 A1* | 1/2019 | Ozturk | H04L 1/1819 |

FOREIGN PATENT DOCUMENTS

| | | |
|---|---|---|
| CN | 101677460 A | 3/2010 |
| CN | 104919879 A | 9/2015 |
| CN | 105120463 A | 12/2015 |
| CN | 106465391 A | 2/2017 |
| JP | 2014241637 A | 12/2014 |
| KR | 20130109164 A | 10/2013 |
| RU | 2518388 C2 | 6/2014 |
| WO | WO 2012/081867 A2 | 6/2012 |
| WO | WO 2014/110545 A1 | 7/2014 |
| WO | WO 2016/064048 A1 | 4/2016 |
| WO | WO 2016/064049 A1 | 4/2016 |
| WO | WO 2017/180280 A1 | 10/2017 |

OTHER PUBLICATIONS

Office Action dated Nov. 30, 2019, in counterpart India Application No. 201737013331 and English translation thereof.
Office Action dated Oct. 29, 2019, in counterpart Russian Application No. 2019105855/08 and English translation thereof.
Huawei, HiSlicon, *DCI design for short TTI*, 3GPP TSG RAN WG1 Meeting #85, Nanjing, China, May 23-27, 2016, 15 pgs.
InterDigital Communications, *On sPDCCH Design*, 3GPP TSG RAN WG1 Meeting #86, Gothenburg, Sweden Aug. 22-26, 2016, 4 pgs.
Xiaomi Communications, *Discussions on DCI design consideration for shortened TTI SPS operation*, 3GPP TSG RAN WG1 meeting #86, Gothenburg, Sweden, Aug. 22-26, 2016, 3 pgs.
3GPP TSG RAN WG1 Meeting #83, *Overview of Specification Impact for TTI Shortening*, Alcatel-Lucent Shanghai Bell, Alcatel-Lucent, Anaheim, US, Nov. 15-22, 2014, 3 pgs.
3GPP TSG RAN WG1 Meeting #85, *DCI design for short TTI*, Huawei, HiSilicon, Nanjing, China, May 23-27, 2016, 15 pgs.
Extended Search Report for European Application No. 16912447.6 from the European Patent Office, dated Jun. 3, 2019.
3GPP TSG RAN WG1 Meeting #84, *Views on TTI Length*, Huawei, HiSilicon, Busan, Korea, Apr. 11-15, 2016, 5 pages.

* cited by examiner

METHODS AND DEVICES FOR RESOURCE SCHEDULING

CROSS-REFERENCE TO RELATED APPLICATIONS

This application is based upon and claims priority to PCT Application No. PCT/CN2016/095055, filed Aug. 12, 2016, the entire contents of which are incorporated herein by reference.

TECHNICAL FIELD

The present disclosure generally relates to the technical field of wireless communication, and more particularly, to methods and devices for resource scheduling.

BACKGROUND

With the development of wireless communication technology, relevant organizations are carrying on research and standardization of a next generation of mobile communication technology standards, including research and standardization of latency reduction. Relevant organizations have worked on a latency reduction project of the physical layer recently, and the goal is to reduce a transmission time interval (TTI) to a short TTI (sTTI), to achieve the latency reduction purpose by reducing a length of the TTI.

In a Long Term Evolution (LTE) system, the TTI is 1 millisecond (ms), which corresponds to a length of one subframe. Therefore, in the current LTE system, the following scheme is used to activate a TTI resource: a location of the subframe to be activated is configured by an upper layer, and the subframe is activated by a scheduler at a lower layer according to the configuration.

After the TTI is reduced to an sTTI, one subframe may include multiple sTTI resources. For example, when each sTTI resource corresponds to two OFDM symbols, one subframe may include 7 sTTI resources. When a number and locations of sTTI resources to be activated are configured by the upper layer using a conventional method, the flexibility of the sTTI resource scheduling may be restricted and resources may be wasted. Moreover, if the number and locations of the sTTI resources to be activated need to be adjusted, reconfiguration by the upper layer is needed. During this time, signaling interaction between the upper layer and the lower layer is required, which increases the time for reconfiguration, and may not meet the requirement of latency reduction.

SUMMARY

The embodiments of the present disclosure provide a resource scheduling method, a scheduler, a base station, a terminal, and a system. The technical solutions are as follows.

According to a first aspect of the embodiments of the present disclosure, there is provided a resource scheduling method for use in a base station. The method includes: receiving semi-persistent scheduling (SPS) configuration information sent by a radio resource control (RRC) layer, the SPS configuration information including a period of SPS, and the period of the SPS indicating a time interval between two adjacent scheduling subframes; determining a short transmission time interval (sTTI) resource activated in a target scheduling subframe according to the SPS configuration information and reference information; and providing an activation parameter to a physical layer according to the sTTI resource activated in the target scheduling subframe, such that the physical layer generates an activation notification containing the activation parameter for notifying a terminal of the sTTI resource activated in the target scheduling subframe.

According to a second aspect of the present disclosure, there is provided a resource scheduling method for use in a terminal. The method includes: receiving SPS configuration information sent by a base station, the SPS configuration information including a period of SPS, and the period of the SPS indicating a time interval between two adjacent scheduling subframes; acquiring an activation notification sent by the base station according to the period of the SPS, the activation notification containing an activation parameter for indicating an sTTI resource activated in a target scheduling subframe; and occupying the activated sTTI resource in the target scheduling subframe for data transmission.

According to a third aspect of the embodiments of the present disclosure, there is provided a base station, including: a processor; and a memory for storing instructions executable by the processor. The processor is configured to: control an RRC layer to send SPS configuration information to a scheduler, the SPS configuration information including a period of SPS, and the period of the SPS being used for indicating a time interval between two adjacent scheduling subframes; control the scheduler to determine an sTTI resource activated in a target scheduling subframe according to the SPS configuration information and reference information, and provide an activation parameter to a physical layer according to the sTTI resource activated in the target scheduling subframe; and control the physical layer to generate an activation notification containing the activation parameter, and send the activation notification to the terminal, the activation notification being configured to notify the terminal of the sTTI resource activated in the target scheduling subframe.

According to a fourth aspect of the embodiments of the present disclosure, there is provided a terminal, including: a processor, and a memory for storing instructions executable by the processor. The processor is configured to: receive SPS configuration information sent by a base station, the SPS configuration information including a period of SPS, the period of the SPS indicating a time interval between two adjacent scheduling subframes; acquire an activation notification sent by the base station according to the period of the SPS, the activation notification containing an activation parameter for indicating an sTTI resource activated in a target scheduling subframe; and occupy the activated sTTI resource in the target scheduling subframe for data transmission.

According to a fifth aspect of the embodiments of the present disclosure, there is provided a non-transitory computer-readable storage medium including instructions, executable by a processor in a base station, for performing the resource scheduling method in the above first aspect.

According to a sixth aspect of the embodiments of the present disclosure, there is provided a non-transitory computer-readable storage medium including instructions, executable by a processor in a terminal, for performing the resource scheduling method in the above second aspect.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
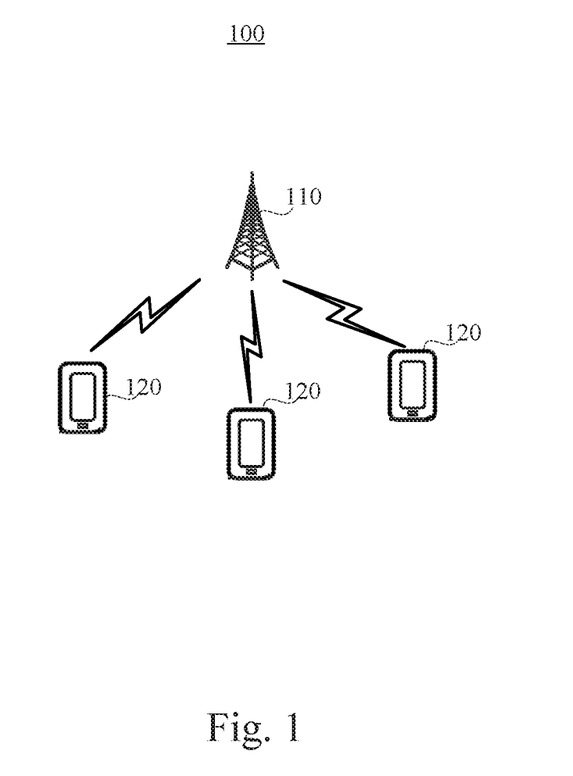
FIG. 1 is a schematic diagram of a system for resource scheduling according to an exemplary embodiment.

FIG. 1 is a schematic diagram of a system 100 for resource scheduling according to an exemplary embodiment. The system 100 includes a base station 110 and at least one terminal 120 located within a cell managed by the base station 110.

In exemplary embodiments, the base station 110 communicates with each terminal 120 through an air interface technology, for example, a cellular technology. The system 100 may be a Long Term Evolution (LTE) system, an evolved system subsequent to the LTE system, such as a LTE-A (LTE-Advanced) system, or a 5th Generation (5G) system.

In exemplary embodiments, the terminals 120 may include various types of hand-held devices, vehicle-mounted devices, wearable devices, computing devices with wireless communication function, or other processing devices connected to a wireless modem, and various forms of user equipment (UE), a mobile station (MS), a terminal device, and the like.

In exemplary embodiments, the base station 110 is a device deployed in a radio access network to provide a wireless communication function for the terminals 120. The base station 110 may be one of various forms of macro base stations, micro base stations, relay stations, access points, and the like. In a system employing different radio access technologies, the name of a device having a base station function may be different, for example, an evolved Node B (evolved NodeB, eNB or eNodeB) in an LTE system.

In exemplary embodiments, the system 100 is configured to reduce a transmission time interval (TTI) to a short TTI (sTTI). In one embodiment, each sTTI resource corresponds to 0.5 ms. In another embodiment, each sTTI resource corresponds to two orthogonal frequency division multiplexing (OFDM) symbols.

The system 100 solves sTTI resource allocation and scheduling problems in conventional methods, by using an upper layer to configure a period of semi-persistent scheduling (SPS), and using a lower layer scheduler to allocate and activate sTTI resources, as described below.

Figure 2:
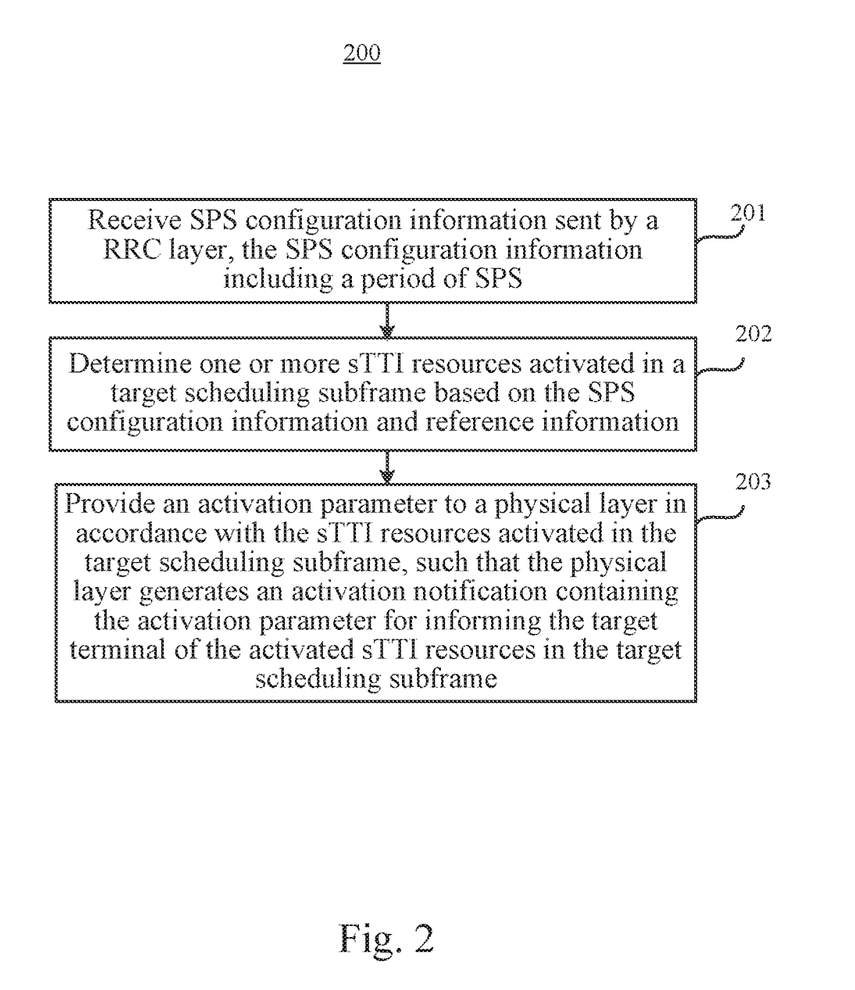
FIG. 2 is a flow chart of a resource scheduling method according to an exemplary embodiment.

FIG. 2 is a flow chart of a resource scheduling method 200 according to an exemplary embodiment. For example, the method 200 may be applied to a scheduler of a base station, such as the base station 110 (FIG. 1). The scheduler may be a functional entity at a lower layer, such as a media access control (MAC) layer, of the base station, and is mainly responsible for allocating and scheduling time-frequency resources. The scheduler may be implemented by hardware, or software, or a combination of hardware and software. Referring to FIG. 2, the method 200 includes the following steps.

In step 201, SPS configuration information sent by a radio resource control (RRC) layer is received, the SPS configuration information including a period of SPS.

In the exemplary embodiment, the period of SPS is configured by an upper layer, such as the RRC layer. The period of SPS is used to indicate a time interval between two adjacent scheduling subframes. A scheduling subframe is a subframe from which the scheduler can select one or more sTTI resources for allocation and activation. In the present disclosure, a length of the period of SPS is not limited, and the length of the period of SPS includes, but is not limited to, any one of 40 ms, 20 ms, 10 ms, 5 ms, 2 ms, or 1 ms. In the present embodiment, it is assumed that the SPS configuration information is configured by the base station for a target terminal, e.g., the terminal 120 (FIG. 1), in a cell under its management. For example, when the period of SPS configured by the base station for the target terminal is 10 ms, the time interval between two adjacent scheduling subframes of the target terminal is 10 ms. Within a scheduling subframe of the target terminal, the scheduler may select one or more sTTI resources to be allocated to the target terminal, and activate the allocated sTTI resources.

In exemplary embodiments, first and second situations may exist when configuring the SPS configuration information by the upper layer. In the first situation, a number and locations of the sTTI resources to be activated are not given. In the second situation, a reference value of the number of the sTTI resources to be activated is given, but the locations of the sTTI resources to be activated are not given. For the second situation, the SPS configuration information also includes a reference value of the number of the sTTI resources to be activated, and the reference value may be set by the upper layer according to actual traffic conditions. For example, when each sTTI resource corresponds to 2 OFDM symbols, one subframe may include 7 sTTI resources, and the upper layer may provide a reference value, for example 3, of the number of the sTTI resources to be activated, depending on actual service conditions of the target terminal.

In the case where an sTTI resource of 0.5 ms and an sTTI resource of 2 OFDM symbols are both supported at the same time, if the upper layer provides the reference value of the number of the sTTI resources to be activated, there are seven possible values of the reference value, and the reference value may be represented by 3 bits.

In step 202, one or more sTTI resources activated in a target scheduling subframe are determined based on the SPS configuration information and reference information.

In exemplary embodiments, the scheduler at the lower layer is configured to allocate and activate sTTI resources. The scheduler may be located at the MAC layer. The scheduler determines whether sTTI resources need to be activated in each scheduling subframe of the target terminal according to the SPS configuration information and the reference information of the target terminal. When it is determined that sTTI resources in a target scheduling subframe need to activated, the scheduler further determines the sTTI resources activated in the target scheduling subframe. For example, the scheduler determines a number and locations of the sTTI resources activated in the target scheduling subframe. The reference information includes, but is not limited to, at least one of sTTI configuration information, data to be scheduled by the scheduler, and a radio resource condition. The sTTI configuration information includes information indicating a duration of each sTTI resource, for example, the sTTI configuration information includes two selectable parameters of 0.5 ms and 2 OFDM symbols. The data to be scheduled by the scheduler may include information such as a total amount of data scheduled by the scheduler, and an amount of data scheduled by the scheduler for the target terminal. The radio resource condition may include an allocation, an occupation, and a quality of radio resources and the like, for example, a condition of allocating sTTI resources for other terminals, and interference of the sTTI resources. The scheduler processes the above noted information according to a preset scheduling algorithm to determine whether sTTI resources need to be activated in each scheduling subframe of the target terminal, and further determine the sTTI resources activated in the target scheduling subframe when it is determined that sTTI resources in the target scheduling subframe need to be activated.

Figure 3:
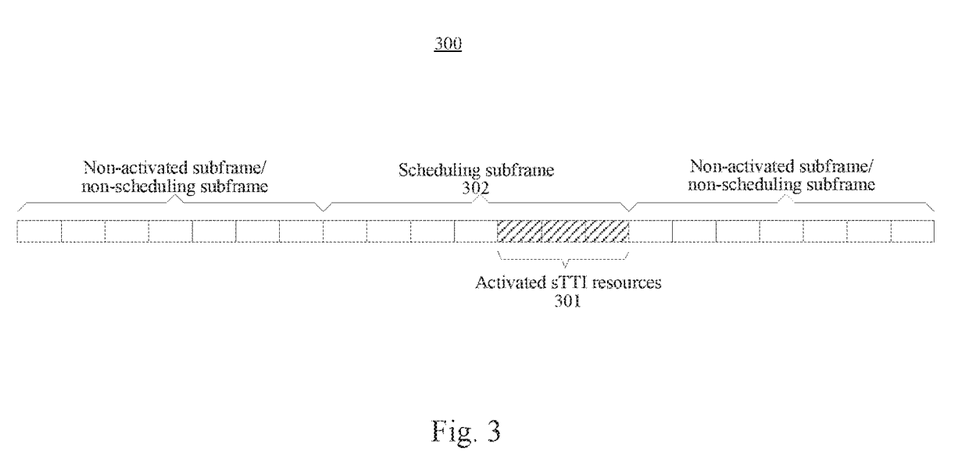
FIG. 3 is a schematic diagram of a resource activation method according to an exemplary embodiment.

FIG. 3 is a schematic diagram of a resource activation method 300 according to an exemplary embodiment. In the exemplary embodiment, it is assumed that each sTTI resource corresponds to 2 OFDM symbols. Accordingly one subframe includes 7 sTTI resources. As shown in FIG. 3, the scheduler selects three sTTI resources 301 to be activated within a scheduling subframe 302 of the target terminal. Further, the scheduler may appropriately adjust the number and/or the locations of the activated sTTI resources according to the SPS configuration information and the reference information in different scheduling subframes of the target terminal. After the sTTI resources 301 in the scheduling subframe 302 are activated by the scheduler, the scheduling subframe 302 is an activated subframe.

Referring back to FIG. 2, in step 203, an activation parameter is provided to a physical layer in accordance with the sTTI resources activated in the target scheduling subframe, such that the physical layer generates an activation notification containing the activation parameter for informing the target terminal about the activated sTTI resources in the target scheduling subframe.

In exemplary embodiments, the activation parameter is used to indicate the sTTI resources activated in the target scheduling subframe. For example, the activation parameter may indicate the number and the locations of the sTTI resources activated in the target scheduling subframe. Also for example, when the target scheduling subframe is a scheduling subframe of the target terminal, the base station sends to the target terminal an activation notification containing the activation parameter for notifying the target terminal of the sTTI resources activated in the target scheduling subframe.

In some embodiments, the activation notification is downlink control information (DCI), which contains a parameter for indicating the number and the location of the activated sTTI resources. For example, the number and the location of the sTTI resources may be represented by a form of bitmap. In addition, if the upper layer provides a reference value for the number of the activated sTTI resources in the SPS configuration information and selects the reference value as a final determined number of the activated sTTI resources, the activation parameter contained in the activation notification may only indicate the location of the activated sTTI resources, thereby saving the number of bits required for indicating the number of the activated sTTI resources. In one embodiment, the activation notification takes one subframe as a notification period. When the activation notification is DCI, slow DCI is selected, i.e., the notification period is one subframe of DCI (e.g., 1 ms).

In addition, for different activated subframes, the scheduler can properly adjust the number and/or location of the activated sTTI resources according to the SPS configuration information and the reference information to realize the reconfiguration of the sTTI resources. When the scheduler needs to activate the sTTI resources, the scheduler may send an activation instruction to the physical layer to cause the physical layer to generate an activation notification, and the base station sends the activation notification to the terminal for informing the terminal to activate the sTTI resources.

In the method 200, the scheduler receives the SPS configuration information sent by the upper layer such as the RRC layer, and determines the activated sTTI resources in the target scheduling subframe according to the SPS configuration information and the reference information. In this way, the problems in related art that the flexibility of the sTTI resource scheduling is restricted, the resources are wasted and the time consumed for reconfiguration increases due to the sTTI resources to be activated being configured by the upper layer, are solved. Moreover, in the method 200, the scheduling of the sTTI resources is not restricted by the set limit of the SPS configuration, the flexibility of the sTTI resource scheduling is improved, and the scheduler of the base station can easily adjust the sTTI resources granularity, which avoids the problem of wasting resources, and is conducive to saving time consumed for reconfiguration.

In addition, the method 200 provided by the present disclosure is applicable to an uplink SPS and a downlink SPS.

Figure 4:
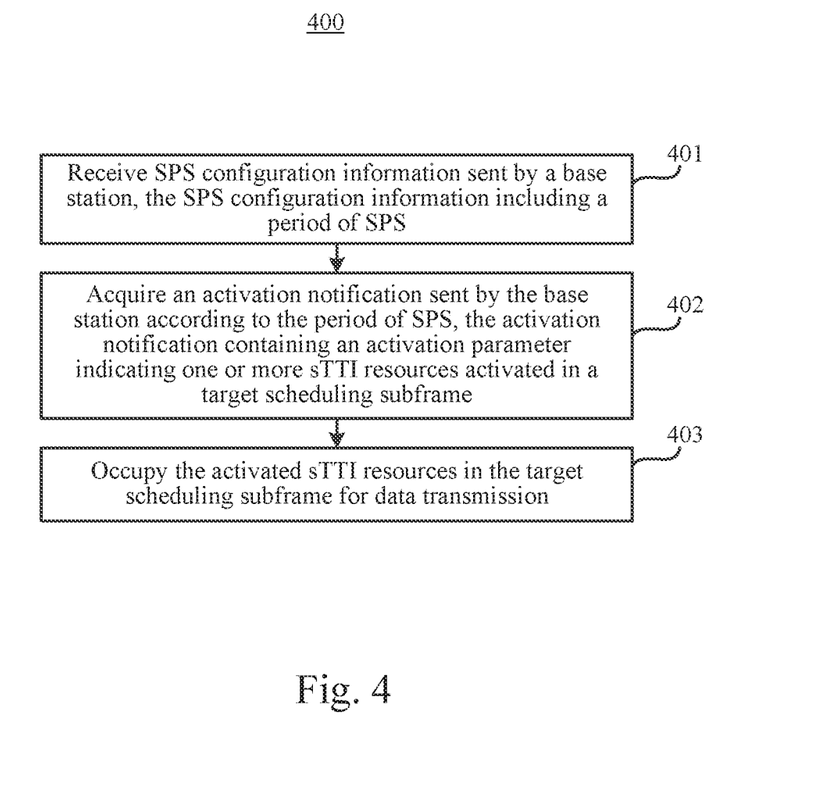
FIG. 4 is a flow chart of a resource scheduling method according to another exemplary embodiment.

FIG. 4 is a flow chart of a resource scheduling method 400 according to another exemplary embodiment. For example, the method 400 may be applied to a terminal, such as the terminal 120 (FIG. 1). Referring to FIG. 4, the method 400 includes the following steps.

In step 401, SPS configuration information sent by a base station is received, the SPS configuration information including a period of SPS.

In exemplary embodiments, the period of SPS is configured by an upper layer e.g., an RRC layer, of the base station. The period of SPS indicates a time interval between two adjacent scheduling subframes. The SPS configuration information may also include an offset value. The terminal determines a location of a target scheduling subframe allocated by the base station for the terminal according to the period of SPS and the offset value.

In step 402, an activation notification sent by the base station is acquired according to the period of SPS, the activation notification containing an activation parameter indicating one or more sTTI resources activated in a target scheduling subframe.

In exemplary embodiments, after determining the location of each scheduling subframe, the terminal acquires information sent by the base station in the scheduling subframe, and analyzes the information to determine whether the base station allocates sTTI resources for the terminal in the scheduling subframe. If the terminal acquires the activation notification sent by the base station within the target scheduling subframe, and determines that the activation notification is sent by the base station to the terminal by analysis, the terminal reads the activation parameter contained in the activation notification. The activation parameter indicates the sTTI resources activated in the target scheduling subframe. In one embodiment, the activation parameter indicates a number and locations of the sTTI resources activated in the target scheduling subframe.

In some embodiments, the activation notification is DCI, which contains a parameter for indicating the number and locations of the activated sTTI resources. For example, the number and locations of the sTTI resources may be represented in a form of bitmap. In addition, if the upper layer of the base station provides a reference value of the number of the activated sTTI resources in the SPS configuration information and selects the reference value as a final determined number of the activated sTTI resources, then the activation parameter included in the activation notification may only indicate the locations of the activated sTTI resources, thereby saving the number of bits for indicating the number of the activated sTTI resources.

In step 403, the activated sTTI resources are occupied in the target scheduling subframe for data transmission.

For example, after determining the sTTI resources activated in the target scheduling subframe, the terminal may occupy the activated sTTI resources in the target scheduling subframe for receiving and/or sending data.

In the illustrated embodiment, an operation flow on the terminal side is provided, and the terminal determines its sTTI resources allocated by the base station based on the acquired activation notification and occupies the activated sTTI resources for data transmission. In the method 400, the scheduling of the sTTI resources is not restricted by the fixed limit of the SPS configuration, and the flexibility of the sTTI resource scheduling is improved. The scheduler of the base station can easily adjust the granularity of the sTTI resources, which avoids the waste of resources, and is beneficial to saving time for reconfiguration.

Figure 5:
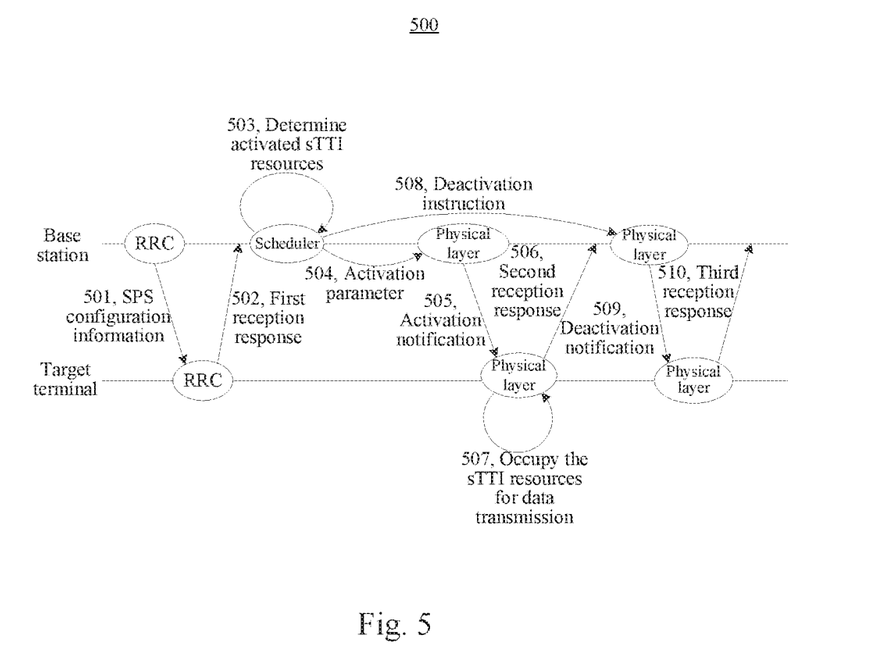
FIG. 5 is a flow chart of a resource scheduling method according to another exemplary embodiment.

FIG. 5 is a flow chart of a resource scheduling method 500 according to another exemplary embodiment. For example, the method 500 may be applied to the system 100 (FIG. 1). Referring to FIG. 5, the method 500 includes the following steps.

In step 501, an RRC layer of a base station, e.g., the base station 110 (FIG. 1), sends SPS configuration information to a scheduler of the base station, and also sends the SPS configuration information to a target terminal, e.g., the terminal 120 (FIG. 1).

In exemplary embodiments, the SPS configuration information includes a period of SPS. The SPS configuration information may also include a reference value of a number of activated sTTI resources. The SPS configuration information may also include indication information for establishing or releasing a connection, Hybrid Automatic Repeat reQuest (HARQ) information, and the like.

In step 502, the target terminal sends a first reception response to the base station after receiving the SPS configuration information.

In exemplary embodiments, the first reception response indicates that the target terminal has successfully received the SPS configuration information.

In step 503, the scheduler of the base station determines one or more sTTI resources activated in the target scheduling subframe of the target terminal according to the SPS configuration information and reference information.

In exemplary embodiments, the scheduler determines whether sTTI resources need to be activated in each scheduling subframe of the target terminal, and further determines a number and locations of the activated sTTI resources in the target scheduling subframe when it is determined that the sTTI resources in the target scheduling subframe need to be activated. In some embodiments, the reference information includes, but is not limited to, at least one of sTTI configuration information, data to be scheduled by the scheduler, and a radio resource condition.

In step 504, the scheduler of the base station provides an activation parameter to a physical layer.

In exemplary embodiments, the activation parameter is used to indicate the sTTI resources activated in the target scheduling subframe of the target terminal. In some embodiments, the activation parameter is used to indicate the number and the location of the sTTI resources activated in the target scheduling subframe.

In step 505, the physical layer of the base station generates an activation notification containing the activation parameter and sends the activation notification to the target terminal.

In exemplary embodiments, the activation notification is used to inform the target terminal of the sTTI resources activated in the target scheduling subframe, for example, the number and the location of the activated sTTI resources. In some embodiments, the activation notification is DCI. In some embodiments, the activation notification takes one subframe (e.g., 1 ms) as a notification period.

Accordingly, the target terminal acquires the activation notification sent by the base station according to the SPS configuration information.

In step 506, the target terminal sends a second reception response to the base station.

In exemplary embodiments, the second reception response is used to indicate that the target terminal has successfully received the activation notification.

In step 507, the target terminal occupies the activated sTTI resources in the target scheduling subframe for data transmission.

In step 508, the scheduler of the base station sends a deactivation instruction to the physical layer.

In step 509, the physical layer of the base station generates a deactivation notification and sends the deactivation notification to the target terminal.

In exemplary embodiments, when the scheduler needs to deactivate the sTTI resources, the scheduler may send a deactivation instruction to the physical layer to cause the physical layer to generate a deactivation notification. The base station sends the deactivation notification to the target terminal, so as to inform the target terminal to deactivate the sTTI resources.

In step 510, the target terminal sends a third reception response to the base station after receiving the deactivation notification.

In exemplary embodiments, the third reception response is used to indicate that the target terminal has successfully received the deactivation notification. After that, the target terminal stops occupying the sTTI resource.

In the method 500, the scheduler of the base station receives the SPS configuration information sent by the RRC layer, and determines the activated sTTI resources in the target scheduling subframe according to the SPS configuration information and the reference information. In this way, the problems in related art that the flexibility of the sTTI resource scheduling is restricted, the resources are wasted and the time consumed for reconfiguration increases due to the sTTI resources to be activated being configured by the upper layer, are solved. Moreover, in the method 500, the scheduling of the sTTI resources is not restricted by the fixed limit of the SPS configuration, the flexibility of the sTTI resource scheduling is improved, and the scheduler of the base station can easily adjust the sTTI resource granularity, which avoids the problem of wasting resources, and is conducive to save time consumed for reconfiguration.

Figure 6:
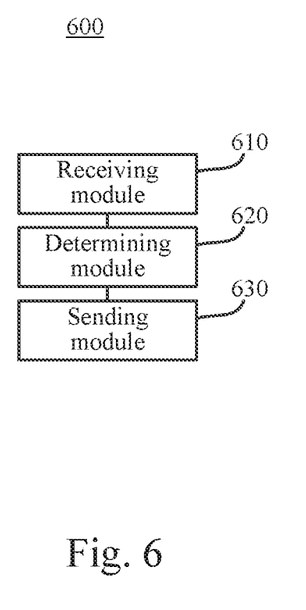
FIG. 6 is a block diagram of a scheduler of a base station according to an exemplary embodiment.

FIG. 6 is a block diagram of a scheduler 600 of a base station according to an exemplary embodiment. The scheduler 600 may be used in a base station. The scheduler 600 implements the resource scheduling method described above, and can be implemented by hardware, or software, or a combination of hardware and software. The scheduler 600 includes a receiving module 610, a determining module 620, and a sending module 630.

The receiving module 610 is configured to receive SPS configuration information sent by an RRC layer, the SPS configuration information including a period of SPS, and the period of SPS indicating a time interval between two adjacent scheduling subframes.

The determining module 620 is configured to determine one or more sTTI resources activated in a target scheduling subframe according to the SPS configuration information and reference information.

The sending module 630 is configured to provide an activation parameter to a physical layer in accordance with the sTTI resources activated in the target scheduling subframe, such that the physical layer generates an activation notification containing the activation parameter for notifying a terminal of the sTTI resources activated in the target scheduling subframe.

In some embodiments, the SPS configuration information further includes a reference value of a number of the activated sTTI resources.

In some embodiments, the activation parameter is configured to indicate a number and locations of the sTTI resources activated in the target scheduling subframe.

In some embodiments, one subframe is taken as a notification period by the activation notification.

In some embodiments, the activation notification is DCI.

In some embodiments, the reference information includes at least one of: sTTI configuration information, data to be scheduled by the scheduler, and a radio resource condition.

In some embodiments, each sTTI resource corresponds to one of 0.5 ms or two OFDM symbols.

In the exemplary embodiment, the scheduler 600 receives the SPS configuration information sent by the RRC layer, and determines the activated sTTI resources in the target scheduling subframe according to the SPS configuration information and the reference information. In this way, the problems in related art that the flexibility of the sTTI resource scheduling is restricted, the resources are wasted and the time consumed for reconfiguration increases due to the sTTI resources to be activated being configured by the upper layer, are solved. Moreover, by using the scheduler 600, the scheduling of the sTTI resource is not restricted by the fixed limit of the SPS configuration, the flexibility of the sTTI resource scheduling is improved, and the base station can easily adjust the sTTI resource granularity, which avoids the problem of wasting resources, and is conducive to save time consumed for reconfiguration.

Figure 7:
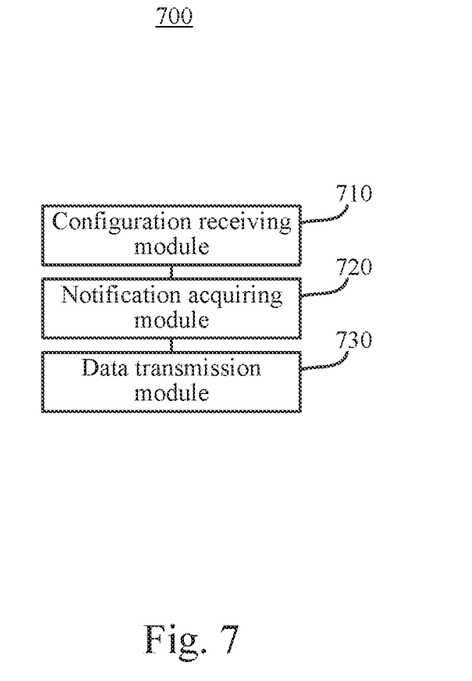
FIG. 7 is a block diagram of a terminal according to an exemplary embodiment.

FIG. 7 is a block diagram of a terminal 700 according to an exemplary embodiment. The terminal 700 implements the resource scheduling method described above, and can be implemented by hardware, or software, or a combination of hardware and software. The terminal 700 includes: a configuration receiving module 710, a notification acquiring module 720, and a data transmission module 730.

The configuration receiving module 710 is configured to receive SPS configuration information sent by a base station, the SPS configuration information including a period of SPS, and the period of SPS indicating a time interval between two adjacent scheduling subframes.

The notification acquiring module 720 is configured to acquire an activation notification sent by the base station according to a period of SPS, the activation notification containing an activation parameter for indicating one or more sTTI resources activated in a target scheduling subframe.

The data transmission module 730 is configured to occupy the activated sTTI resources in the target scheduling subframe for data transmission.

Alternatively, the activation parameter is configured to indicate a number and a location of the sTTI resource activated in the target scheduling subframe.

In some embodiments, the activation notification is DCI.

In some embodiments, each sTTI resource corresponds to one of 0.5 ms or two OFDM symbols.

In the terminal 700, the scheduling of sTTI resources is not limited to the fixed limit of the SPS configuration, and the flexibility of the sTTI resource scheduling is improved. The scheduler of the base station can easily adjust the granularity of the sTTI resources, which avoids the problem of wasting resources, and is beneficial to save time for reconfiguration.

With respect to the scheduler 600 (FIG. 6) and the terminal 700 (FIG. 7), the specific manner for performing the operation by each module has been described in detail in the embodiment relating to the corresponding method, which will not be repeated herein.

An exemplary embodiment of the present disclosure also provides a base station for implementing the resource scheduling method at the base station side provided by the present disclosure. The base station includes: a processor, and a memory for storing instructions executable by the processor. The processor is configured to: control a radio resource control RRC layer to send SPS configuration information to a scheduler, the SPS configuration information including a period of SPS, and the period of SPS indicating a time interval between two adjacent scheduling subframes; control the scheduler to determine an sTTI resource activated in a target scheduling subframe according to the SPS configuration information and reference information, and to provide an activation parameter to a physical layer according to the sTTI resource activated in the target scheduling subframe; and control the physical layer to generate an activation notification containing the activation parameter, and to send the activation notification to a terminal, the activation notification being configured to notify the terminal of the sTTI resource activated in the target scheduling subframe.

An exemplary embodiment of the present disclosure also provides a terminal for implementing the resource scheduling method at the terminal side provided by the present disclosure. The terminal includes: a processor; and a memory for storing instructions executable by the processor. The processor is configured to: receive SPS configuration information sent by a base station, the SPS configuration information including a period of SPS, the period of SPS indicating a time interval between two adjacent scheduling subframes; acquire an activation notification sent by the base station according to the period of SPS, the activation notification containing an activation parameter for indicating an sTTI resource activated in a target scheduling subframe; and occupy the activated sTTI resource in the target scheduling subframe for data transmission.

Figure 8:
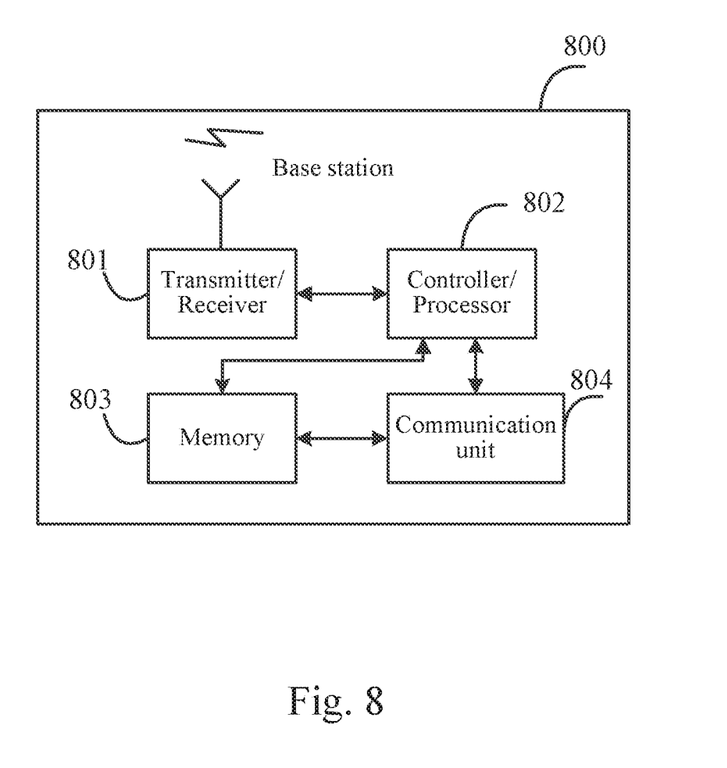
FIG. 8 is a block diagram of a base station according to an exemplary embodiment.

FIG. 8 is a block diagram of a base station 800 according to an exemplary embodiment. Referring to FIG. 8, the base station 800 includes a transmitter/receiver 801 and a processor 802. The processor 802 may also be a controller. The transmitter/receiver 801 is configured to support information transceiving between the base station 800 and a terminal, and to support radio communication between the terminal and other terminals. The processor 802 performs various functions for communicating with the terminal. In the uplink, an uplink signal from the terminal is received via an antenna, demodulated by the receiver 801 (e.g., a high frequency signal is demodulated into a baseband signal), and further processed by the processor 802 to recover data and signaling information sent by the terminal. In the downlink, data and signaling messages are processed by the processor 802 and modulated by the transmitter 801 (e.g., modulating the baseband signal into the high frequency signal) to generate a downlink signal and transmit it to the terminal via the antenna. It should be noted that the above-described functions of demodulation or modulation may be performed by the processor 802 as well. For example, the processor 802 is also operable to perform steps in the method embodiments described above with respect to the base station side, and/or other steps described in the embodiments of the present disclosure.

The base station 800 further includes a memory 803 for storing program code and data of the base station 800. In addition, the base station also includes a communication unit 804. The communication unit 804 is configured to enable the base station 800 to communicate with other network entities, such as network devices in the core network. For example, in the LTE system, the communication unit 804 may be an S1-U interface for supporting a communication between the base station 800 and a Serving Gateway (S-GW), or an S1-MME interface for supporting the base station 800 to communicate with a Mobility Management Entity (MME).

It will be appreciated that FIG. 8 only shows a simplified version of the base station 800 for illustrative purposes. In practice, the base station 800 may contain any number of transmitters, receivers, processors, controllers, memory, communication units, etc., and all base stations that may implement the embodiments of the present disclosure are within the scope of the embodiments of the present disclosure.

Figure 9:
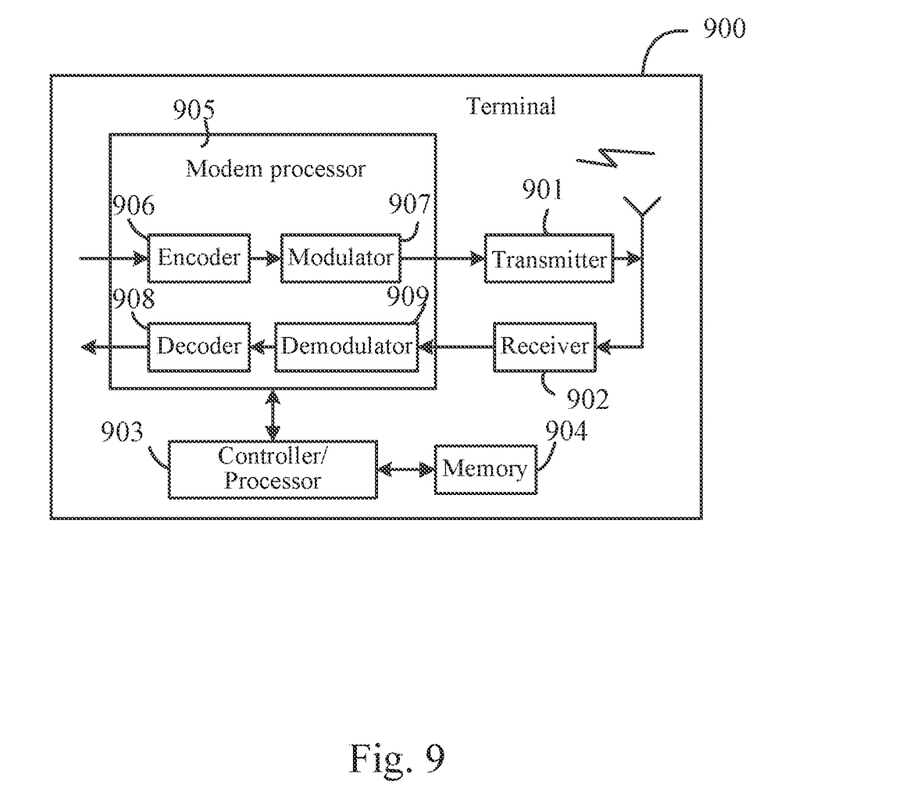
FIG. 9 is a block diagram of a terminal according to an exemplary embodiment.

FIG. 9 is a block diagram of a terminal 900 according to an exemplary embodiment. Referring to FIG. 9, the terminal 900 includes a transmitter 901, a receiver 902, and a processor 903. The processor 903 may also be a controller. The terminal 900 also includes a modem processor 905. The modem processor 905 includes an encoder 906, a modulator 907, a decoder 908, and a demodulator 909.

In one embodiment, the transmitter 901 adjusts (e.g., analog converts, filters, amplifies and upconverts, etc.) output samples and generates an uplink signal that is transmitted via an antenna to the base station described in the above embodiments. In the downlink, the antenna receives a downlink signal transmitted by the base station in the above embodiment. The receiver 902 adjusts (e.g., filters, amplifies, downconverts, digitizes, etc.) signals received from the antenna and provides input samples. In the modem processor 905, the encoder 906 receives data and signaling messages to be sent in the uplink and processes (e.g., formats, codes and interleaves) the data and the signaling messages. The modulator 907 further processes (e.g., symbol maps and modulates) the encoded data and signaling messages and provides output samples. The demodulator 909 processes (e.g., demodulates) the input samples and provides a symbol estimate. The decoder 908 processes (e.g., deinterleaves and decodes) the symbol estimate and provides decoded data and signaling messages that are sent to the terminal 900. The encoder 906, the modulator 907, the demodulator 909, and the decoder 908 may be implemented by a combined modem processor 905. These units are processed according to the radio access technology employed by the radio access network (e.g., LTE and access technologies of other evolved systems). It should be noted that when the terminal 900 does not include the modem processor 905, the above-described functions of the modem processor 905 may be achieved by the processor 903.

The processor 903 controls the operation of the terminal 900 so as to perform the processing performed by the terminal 900 in the above-described embodiments of the present disclosure. For example, the processor 903 may also be used to perform the steps related to the terminal side in the method embodiments described above, and/or other steps described in the embodiments of the present disclosure.

The terminal 900 further includes a memory 904 for storing the program code and data for the terminal 900.

The processor 802 (FIG. 8) and the processor 903 (FIG. 9) may each be a Central Processing Unit (CPU), a general purpose processor, a Digital Signal Processor (DSP), an Application Specific Integrated Circuit (ASIC), a Field Programmable Gate Array (FPGA), or other programmable logic device, a transistor logic device, a hardware component, or any combination thereof, which may implement or perform various illustrative logical blocks, modules, and circuits described in connection with the disclosure of the embodiments of the present disclosure. The processor 802 (FIG. 8) and the processor 903 (FIG. 9) may also each be a combination that implements a computing function, for example including one or more microprocessor combinations, a combination of a DSP and a microprocessor, and the like.

The methods described above may be implemented in hardware, or may be implemented in a manner that the processor executes instructions. The instructions may be composed of corresponding software modules, which may be stored in a Random Access Memory (RAM), a flash memory, a Read Only Memory (ROM), an Erasable Programmable ROM (EPROM), an Electrically EPROM (EEPROM), a register, a hard disk, a removable hard disk, a CD-ROM, or any other form of storage medium known in the art. An exemplary storage medium is coupled to the processor such that the processor can read information from and write information into the storage medium. The storage medium can also be an integral part of the processor. The processor and the storage medium may be located in the ASIC. In addition, the ASIC may be located in a base station or a terminal. The processor and the storage medium may also exist in the base station or the terminal as discrete components.

Embodiments of the present disclosure also provide a computer-readable storage medium for storing instructions executable by the processor 802 of the base station 800 (FIG. 8), to perform the above-described resource scheduling method on the base station side.

Embodiments of the present disclosure also provide a computer-readable storage medium for storing instructions executable by the processor 903 of the terminal 900 (FIG. 9), to perform the above-described resource scheduling method on the terminal side.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A resource scheduling method for use in a base station, comprising:
   receiving semi-persistent scheduling (SPS) configuration information sent by a radio resource control (RRC) layer, the SPS configuration information including a period of SPS, and the period of SPS indicating a time interval between two adjacent scheduling subframes;
   determining a location of a short transmission time interval (sTTI) resource activated in a target scheduling subframe comprising a plurality of sTTI resources according to the SPS configuration information and reference information, wherein the reference information comprises sTTI configuration information; and
   providing an activation parameter to a physical layer according to the sTTI resource activated in the target scheduling subframe, wherein the activation parameter indicates the location of the sTTI resource activated in the target scheduling subframe, such that the physical layer generates an activation notification containing the activation parameter for notifying a terminal of the sTTI resource activated in the target scheduling subframe.

2. The method according to claim 1, further comprising:
   configuring the activation parameter to indicate a number of sTTI resources activated in the target scheduling subframe.

3. The method according to claim 1, further comprising:
   taking, by the activation notification, one subframe as a notification period.

4. The method according to claim 1, further comprising:
   generating, by the physical layer, the activation notification as downlink control information (DCI).

5. The method according to claim 1, wherein the reference information further comprises at least one of: data to be scheduled by a scheduler of the base station, or a radio resource condition.

6. The method according to claim 1, wherein each sTTI resource corresponds to one of 0.5 ms or two orthogonal frequency division multiplexing (OFDM) symbols.

7. The method according to claim 1, wherein the SPS configuration information further comprises a reference value of a number of activated sTTI resources.

8. A resource scheduling method for use in a terminal, comprising:
   receiving, by a radio resource control (RRC) layer, semi-persistent scheduling (SPS) configuration information sent by a base station, the SPS configuration information including a period of SPS, and the period of SPS indicating a time interval between two adjacent scheduling subframes;
   acquiring, by a physical layer, an activation notification sent by the base station according to the period of SPS, the activation notification containing an activation parameter for indicating a location of a short transmission time interval (sTTI) resource activated in a target scheduling subframe comprising a plurality of sTTI resources; and
   occupying the location of the activated sTTI resource in the target scheduling subframe for data transmission.

9. The method according to claim 8, further comprising:
   acquiring the activation parameter to indicate a number of sTTI resources activated in the target scheduling subframe.

10. The method according to claim 8, wherein the activation notification is downlink control information (DCI) sent by the base station.

11. The method according to claim 8, wherein each sTTI resource corresponds to one of 0.5 ms or two orthogonal frequency division multiplexing (OFDM) symbols.

12. A base station, comprising:
    a processor; and
    a memory for storing instructions executable by the processor;
    wherein the processor is configured to:
    control a radio resource control (RRC) layer to send semi-persistent scheduling (SPS) configuration information to a scheduler, the SPS configuration information including a period of SPS, and the period of SPS indicating a time interval between two adjacent scheduling subframes;
    control the scheduler to determine a location of a short transmission time interval (sTTI) resource activated in a target scheduling subframe comprising a plurality of sTTI resources according to the SPS configuration information and reference information, and provide an activation parameter to a physical layer according to the sTTI resource activated in the target scheduling subframe, wherein the reference information comprises sTTI configuration information and the activation parameter indicates the location of the sTTI resource activated in the target scheduling subframe; and
    control the physical layer to generate an activation notification containing the activation parameter, and to send the activation notification to a terminal, the activation notification being configured to notify the terminal of the sTTI resource activated in the target scheduling subframe.

13. The base station according to claim 12, wherein the processor configures the activation parameter to indicate a number of sTTI resources activated in the target scheduling subframe.

14. The base station according to claim 12, wherein the processor configures the activation notification to take one subframe as a notification period.

15. The base station according to claim 12, wherein the processor is further configured to control the physical layer to generate the activation notification as downlink control information (DCI).

16. The base station according to claim 12, wherein the reference information further comprises at least one of: data to be scheduled by the scheduler, or a radio resource condition.

17. The base station according to claim 12, wherein each sTTI resource corresponds to one of 0.5 ms or two orthogonal frequency division multiplexing (OFDM) symbols.

18. The based station according to claim 12, wherein the SPS configuration information further comprises a reference value of a number of activated sTTI resources.

19. A terminal, comprising:
a processor; and
a memory for storing instructions executable by the processor;
wherein the processor is configured to:
receive, by a radio resource control (RRC) layer, semi-persistent scheduling (SPS) configuration information sent by a base station, the SPS configuration information including a period of SPS, the period of the SPS indicating a time interval between two adjacent scheduling subframes;
acquire, by a physical layer, an activation notification sent by the base station according to the period of SPS, the activation notification containing an activation parameter for indicating a location of a short transmission time interval (sTTI) resource activated in a target scheduling subframe comprising a plurality of sTTI resources; and
occupy the location of the activated sTTI resource in the target scheduling subframe for data transmission.

20. The terminal according to claim 19, wherein the processor is further configured to acquire the activation parameter to indicate a number of sTTI resources activated in the target scheduling subframe.

21. The terminal according to claim 19, wherein the processor is further configured to acquire downlink control information (DCI) as the activation notification.

22. The terminal according to claim 19, wherein each sTTI resource corresponds to one of 0.5 ms or two orthogonal frequency division multiplexing (OFDM) symbols.

* * * * *